United States Patent
Schmidt

[15] 3,704,898
[45] Dec. 5, 1972

[54] VEHICLE AXLE SUSPENSION
[72] Inventor: Kenneth J. Schmidt, Thurston, Oreg.
[73] Assignee: General Trailer Co., Inc., Springfield, Oreg.
[22] Filed: Feb. 3, 1971
[21] Appl. No.: 112,135

[52] U.S. Cl. ..........................280/124 R, 267/15 A
[51] Int. Cl. ...............................................B60g 3/12
[58] Field of Search ........280/124 R, 124 F, 104.5 R; 267/15 A

[56] References Cited
UNITED STATES PATENTS
2,597,122   5/1952   Mullen ................................280/124

Primary Examiner—Philip Goodman
Attorney—Kolisch & Hartwell

[57] ABSTRACT

An axle suspension in a vehicle including a rock structure pivoted to the vehicle's frame, which structure, adjacent its free end, carries an axle. An extensible-contractible air bag in the suspension acts between the free end of the rock structure and the vehicle frame. The air bag is mounted in such a way that minimal (although some) relative angular movement occurs between its opposite ends with the extension and contraction of the bag that accompanies rocking of the rock structure.

5 Claims, 4 Drawing Figures

PATENTED DEC 5 1972
3,704,898
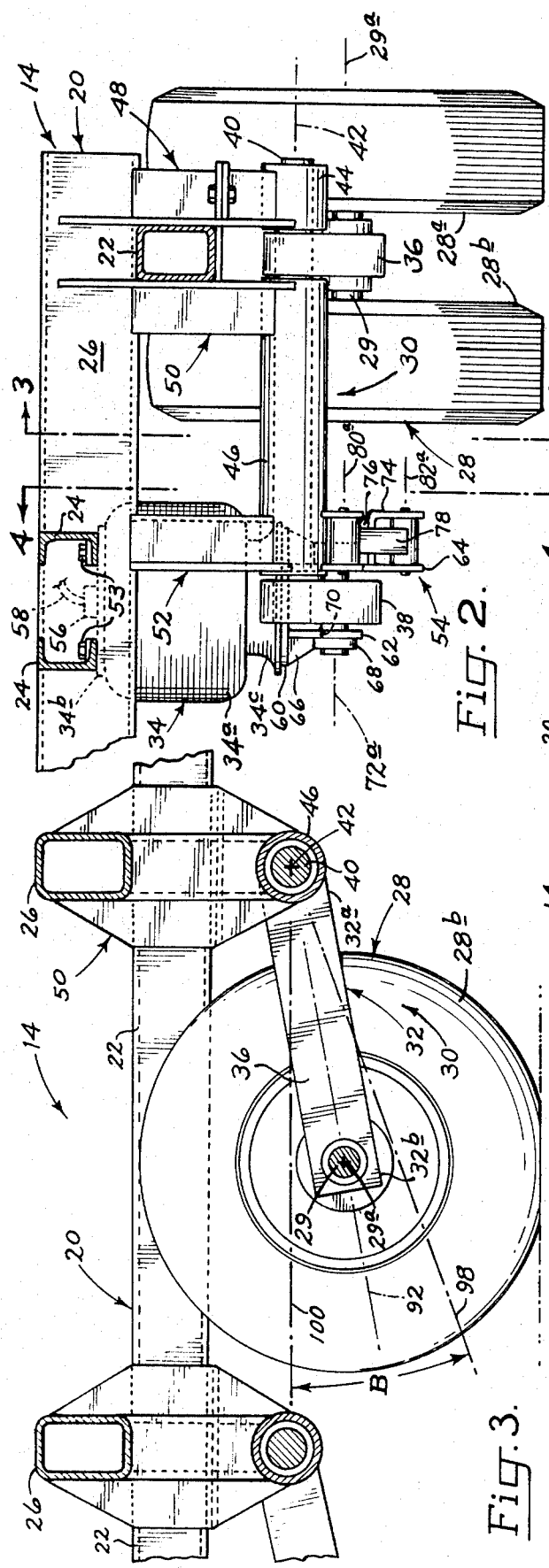
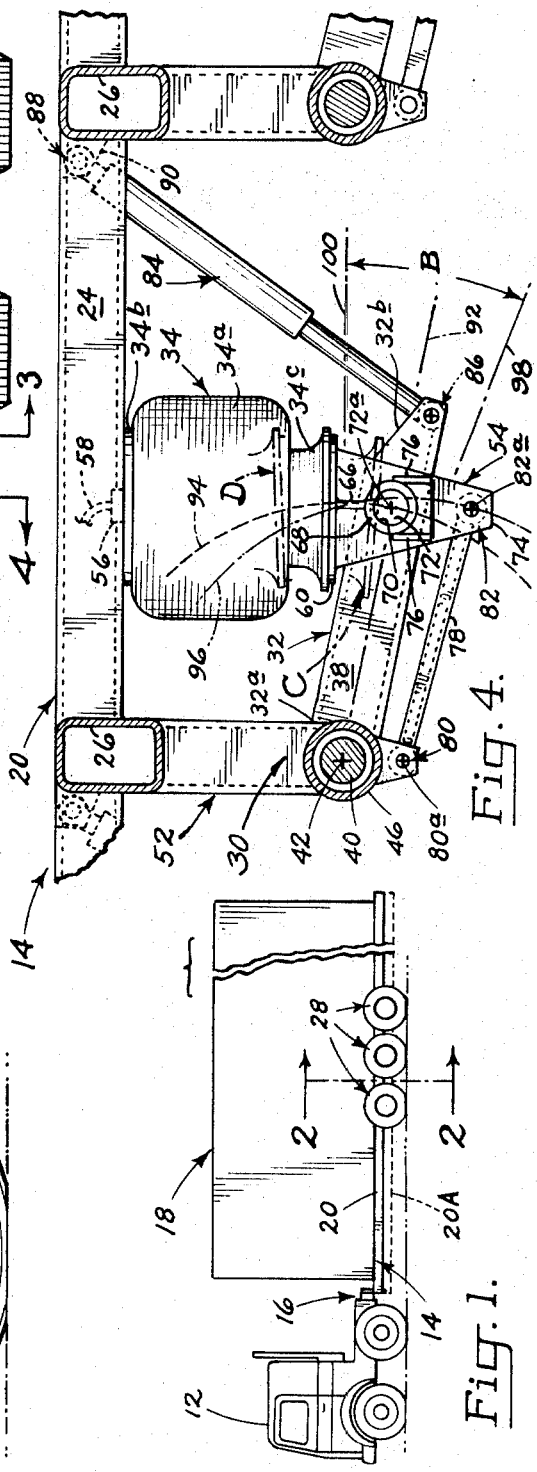
Kenneth J. Schmidt
INVENTOR
BY
Kolisch & Hartwell
Attys.

VEHICLE AXLE SUSPENSION

BACKGROUND AND SUMMARY OF THE INVENTION

This invention pertains to an axle suspension in a vehicle. More particularly, it pertains to such a suspension which employs an extensible-contractible air bag, with means mounting the bag in such a manner that extension and contraction of the bag produce but a slight amount of relative angular movement between the bag's opposite ends.

There are many instances where an air bag type axle suspension in a vehicle is especially desirable. Such a suspension, for example, is capable of providing an extremely smooth ride for the frame in a vehicle, and thus is often preferred in situations where loads that can easily be damaged by excessive jouncing are to be transported. Another desirable feature in an air bag suspension is that its bag, if suitably connected to a supply of air under pressure, can be selectively inflated and deflated (i.e., extended and contracted) to change the elevation of a vehicle's frame relative to the ground. This feature permits the frame in a vehicle to be raised and lowered, for example, for the purpose of picking up and depositing certain kinds of loads which are difficult to handle otherwise. As an illustration, in the case of an especially large and/or heavy and/or bulky load which may be difficult to handle with a crane or the like, a vehicle frame, such as the frame of a lowboy-type highway trailer, supported on an air bag suspension, may be lowered, shifted beneath the load, and then raised to pick up the load. At the point of destination, the load may be deposited by again lowering the trailer frame to place the load on some other supporting structure, and then shifting the frame from beneath the load.

One type of load whose handling (in conjunction with transporting it) is greatly facilitated by using such apparatus is what is known as a modular home unit. Such a unit typically comprises a portion of a partially preassembled home which is to be delivered to a selected home site for joining with one or more other portions. The unit may typically be as long as about 70 feet, as wide as about 14 feet, and may weight 50,000 or more pounds. Obviously, such a load is difficult to pick up and deposit with conventional crane apparatus and the like, and in addition, is not capable of withstanding any significant amount of jouncing while being transported. Thus, and for the purpose of illustration herein, a preferred embodiment of the present invention is described in conjunction with a vehicle adapted to transport a load of the type just mentioned, wherein the invention has been found to have particular utility.

One of the problems with conventional air bag suspensions is that unless particular and careful attention is paid to the manner in which the air bag is mounted, the flexible body in the bag, with repeated extension and contraction, undergoes rapid wear, especially at its opposite ends. Such a situation can obviously present serious maintenance and reliability problems. Further explaining, in a typical air bag suspension where the bag acts between a vehicle frame and a pivoted rock structure that carries a wheel axle, the opposite ends of the bag experience a considerable amount of relative angular movement with bag extension and contraction. This is especially true where the bag is employed not only to give a cushioned ride to a load, but is also relied on to raise and lower the vehicle frame independently of vehicle travel. Appreciable relative angular movement between the opposite ends of a bag tends to overstress and fatigue the material forming the bag's flexible body. In addition, excessive relative angular movement between the ends produces considerable wasted motion.

A general object of the present invention, therefore, is to provide a novel air bag type axle suspension for a vehicle which offers the advantages, and avoids the drawbacks, mentioned above.

Another object of the invention is to provide such a suspension which is simple in construction, and easy to incorporate in various types of existing vehicles.

More particularly, an object of the invention is to provide a suspension of the type generally indicated which includes a rock structure adapted to be pivoted to a vehicle frame and to carry an axle, and an air bag which acts between the rock structure and frame, with means provided that permits but a slight amount of relative angular movement between opposite ends of the bag as the same extends and contracts with rocking of the rock structure.

According to a preferred embodiment of the invention, and considering the same in place in a vehicle, the upper end of the air bag in the suspension is anchored to the vehicle's frame, and the lower end of the bag is anchored to a bracket which is pivoted adjacent the free end of the pivoted rock structure in the suspension. An elongated link has one end pivoted to this bracket, and its other end pivoted to the vehicle's frame adjacent the pivot connection provided for the rock structure. The free end of the rock structure carries a wheel-supporting axle. As the bag extends and contracts (with rocking of the rock structure), the lower end of the bag undergoes a slight angular movement relative to the upper end of the bag and to the vehicle frame. In particular, the lower end of the bag undergoes a considerably smaller amount of relative angular movement than does the rock structure. As a consequence, bag wear adjacent the ends of its flexible body is minimized. The slight amounts of relative angular movement which do occur accommodate the slight relative lateral displacements which occur between the bags ends with rocking of the rock structure.

DESCRIPTION OF THE DRAWINGS

These and other objects and advantages attained by the invention will become more fully apparent as the description which follows is read in conjunction with the accompanying drawings, wherein:

FIG. 1 is a simplified side elevation of a tractor-trailer combination wherein the trailer incorporates a suspension constructed according to the invention;

FIG. 2 is an enlarged fragmentary view taken generally along the line 2—2 in FIG. 1 illustrating details of a suspension as contemplated herein; and FIGS. 3 and 4 are views taken generally along the lines 3—3, 4—4, respectively, in FIG. 2.

DETAILED DESCRIPTION OF THE INVENTION

Turning now to the drawings and referring first to FIG. 1 indicated generally at 10 is a tractor-trailer combination including a conventional tractor 12 and an elongated lowboyntype trailer 14. The tractor and trailer are coupled through a conventional hitch assembly indicated generally at 16. Hitch assembly 16 is a type which permits a limited amount of relative vertical movement between the rear of the tractor and the front of the trailer. Trailer 14 is sized to carry an elongated and relatively wide load, such as the partially preassembled modular home unit shown in block form at 18 in the figure. Unit 18 is typical in size—having a length of about 60 feet, and a width of about 13 feet.

Referring to all of the figures together, trailer 14, also referred to herein as a vehicle, comprises an elongated frame 20 which is made up of a pair of outer longitudinals, such as that shown at 22, pairs of inner longitudinals such as those shown at 24 disposed inwardly of the outer longitudinals, and transverse members 26 joined to and interconnecting the inner and outer longitudinals at multiple points distributed along the length of the frame. As will be apparent from the discussion above, the front of frame 20 is supported on the rear of tractor 12 through hitch assembly 16.

Intermediate its front and rear ends, the frame is supported (at its opposite sides) for travel over the ground through axle-supported wheel assemblies such as those shown at 28. In the particular trailer shown, three such wheel assemblies are provided for each side of the frame, with each wheel assembly, generally speaking, being disposed longitudinally between a pair of transverse members 26 in the frame. The three wheel assemblies provided on the opposite side of the frame from that shown in FIG. 1 are located in positions on such opposite side which correspond to the positions for the three wheel assemblies shown in FIG. 1. Each wheel assembly comprises an outer wheel 28a and an inner wheel 28b journaled on opposite ends of an axle 29. An axle 29 supports the wheels that it carries for turning about an axis 29a (see FIGS. 2 and 3).

Still speaking in general terms, each of the wheel assemblies in trailer 14 is suspended on frame 20 through a suspension means 30 (see FIGS. 2–4, inclusive) which is constructed according to the present invention. More specifically, suspension means 30 supports axles 29 that carry the wheels in the different wheel assemblies.

Considering now in detail the construction of a suspension means 30, and referring to FIGS. 2–4, inclusive, it comprises an elongated rock structure 32 having front and rear ends 32a, 32b, respectively, and an inflatable (extensible-contractible) air bag 34.

The rock structure is made up of a pair of elongated rigid arms 36, 38 which define opposite sides of the structure, and which extend between its front and rear ends. These arms substantially parallel one another, with arm 36 disposed outwardly (relative to the longitudinal center line of frame 20) of arm 38. The forward ends of arms 36, 38 are suitably joined to a shaft 40 for turning as a unit with this shaft. Referring particularly to FIG. 2, it will be noted that arm 36 is joined to shaft 40 at a point inwardly from its right end in the figure, and arm 38 is joined to the left end of the shaft in the figure.

As contemplated herein, the rock structure is pivoted to frame 20 for rocking about a generally horizontal rock axis which extends transversely of the longitudinal axis of the frame. Such a rock axis is indicated at 42, and coincides with the longitudinal axis of shaft 40. Axis 42 substantially parallels axis 29a. In particular, shaft 40 extends through and is journaled within a pair of tubes 44, 46 that are anchored to a transverse member 26 through bracket structures 48, 50, 52. Tube 44 is joined to bracket structure 48, and supports the outer end of shaft 40 through a conventional radial bearing (not illustrated) disposed between the outside of the shaft and the inside of the tube. Tube 46 is joined to bracket structures 50, 52, and receives the portion of shaft 40 which extends between arms 36, 38. Conventional radial bearings are provided adjacent and within opposite ends of tube 46 for supporting the shaft. As can be seen in FIG. 2, bracket structures 48, 50 derive additional support from an outer longitudinal 22.

Air bag 34 is entirely conventional in construction, and includes a central flexible inflatable body 34a (typically made of a reinforced elastomeric material) joined to upper and lower end parts 34b, 34c, respectively. The upper end part of the bag is anchored to the pair of inner longitudinals 24 shown in FIGS. 2 and 4 by means of bolts such as bolts 53. These bolts are referred to herein also as a mounting means for the upper end part in the bag. The lower end part in the bag is secured to a bracket, or mounting means, 54 (see FIGS. 2 and 4) whose construction will be more fully described shortly.

Air is admitted into and exhausted from the body in the bag through a conventional coupling 56 which is mounted on top part 34b. Coupling 56 may be connected to any suitable supply of pressurized air (which may be either on the trailer or on the tractor), and in the case illustrated is connected to the usual air supply on tractor 12 through a flexible hose system, one end of a hose in which is shown at 58. The supply includes a conventional three-way valve which permits selective inflation and deflation of the bag, and which can be adjusted to hold the bag fixed at any intermediate level of inflation.

Bracket 54 comprises a top plate 60 which is suitably secured to the underside of bottom part 34c in the air bag. Joined to and extending downwardly from plate 60 is a pair of spaced-apart substantially parallel plates 62, 64. As can be seen in FIG. 2, plate 64 is considerably longer than plate 62. Plates 62, 64 are braced on plate 60 through gussets 66. Suitably joined to the nonconfronting faces of plates 62, 64 are two axially aligned tubes 68 which surround a pair of axially aligned bores 70 in plates 62, 64. Bracket 54 is pivoted to arm 38 adjacent the arm's rear end by means of a pin 72 which extends through bores 70, through a suitable accommodating bore in arm 38, and which is received within tubes 68. This pivot connection accommodates relative angular movement between the rock structure and bracket 54 (and hence between the rock structure and the lower end of the air bag) about axis 72a of pin 72. Axis 72a substantially parallels axis 42.

Suitably joined to the lower end of plate 64 as shown in FIGS. 2 and 4 is a bent plate member 74 which is braced on plate 64 by means of gussets 76.

Extending between the lower end of bracket 54 and the lower end of bracket structure 52 according to the invention is an elongated link 78. Referring particularly to FIG. 4, the left end of the link in the figure is pivoted at 80 to bracket structure 52, and the right end of the link in the figure is pivoted at 82 to plate 64 and member 74. Pivot connections 80, 82 provide pivot axes 80a, 82a, respectively, for the opposite ends of the link. These two pivot axes substantially parallel previously mentioned axes 42, 72a.

Still referring particularly to FIG. 4, it will be noted that pivot axes 42, 80a are somewhat closer than are axes 72a, 82a. It will be noted further that axes 42, 72a are somewhat closer than are axes 80a, 82a. The importance of this arrangement of the pivot and rock axes will become more fully apparent shortly.

As can be seen in FIG. 4, connected between the right (rear) end of arm 38 in the figure and the right transverse member 26 in the figure is a conventional shock absorber 84. The lower end of the shock absorber in the figure is pivoted at 86 to arm 38, and the upper end of the shock absorber is pivoted at 88 to a bracket 90 which is secured to the left side of the transverse member in the figure.

The other suspension means in trailer 14 for the axles in the other wheel assemblies are essentially the same in construction as the suspension means just described illustrated in FIGS. 2–4, inclusive.

Explaining how the apparatus described herein performs, air bag 34 is shown in a partially inflated condition in FIGS. 2 and 4. More specifically, the bag is inflated about midway between its opposite extremes of inflation. And, with this the case, rock structure 32 and link 78 occupy the respective positions shown for them in FIGS. 2–4, inclusive. It will be noted that under these circumstances the parts in the rock structure occupy a plane indicated by dash-dot line 92 in FIGS. 3 and 4.

Assuming that the air bags in the other axle suspensions are inflated the same amount as the bag shown in FIGS. 2 and 4, frame 20 is supported at the elevation shown in solid outline in FIG. 1 above the ground. Opposite sides of the frame are obviously at substantially the same elevations. With the air supply that is connected to the air bags adjusted to hold them at substantially constant levels of inflation, the bags act as springs to provide a smooth cushioned ride for any load carried on the frame. This is normally the condition in which the air bags operate during transporting of a load (i.e., with the loaded trailer being hauled over the ground). Different levels of partial inflation may, of course, be used for the bags to suit different hauling situations.

Referring particularly to the suspension shown in FIGS. 2–4, inclusive, with air bag 34 therein acting as a spring during hauling of a load, it reacts to rocking of the rock structure (as wheels 28a, 28b ride over bumps and dips in the ground), and extends and contracts accordingly against the resistance of air trapped in the bag. With such rocking of the rock structure, pivot axis 72a shifts up and down along dashed curved line 94 in FIG. 4 (which line is centered on rock axis 42. Pivot axis 82a moves up and down along dash-double-dot curved line 96 in FIG. 4, which line is centered about pivot axis 80a. With axes 42, 72a, 80a, 82a disposed relative to one another with the spacing differences mentioned earlier, bracket 54 changes its angular disposition relative to frame 20 with such rocking of the rock structure. More specifically, as the rock structure shifts upwardly in these figures, bracket 54 rocks slightly in a counter-clockwise direction in FIG. 4 relative to frame 20. The reverse is true with the rock structure moving downwardly in the figure. As a consequence, the lower end of air bag 34 undergoes angular movement relative to the frame corresponding to that occurring in bracket 54.

The total amount of rocking permitted rock structure 32 is indicated by angle B in FIGS. 3 and 4. In other words, the rock structure may rock downwardly to occupy a plane 98, with the air bag then fully extended, and it may rock upwardly to occupy a plane 100, with the air bag then fully contracted. With structure 32 occupying plane 98, the lower end of the air bag occupies the position and angular disposition indicated in dash-dot lines at C in FIG. 4. With the rock structure occupying plane 100, the lower end of the air bag occupies the position and angular disposition shown in dash-dot lines at D in FIG. 4. It will be noted from FIG. 4 that for a given amount of relative angular movement (in either direction) between the rock structure and frame 20, the lower end of air bag 34 undergoes a considerably smaller amount of angular movement relative to the frame. This operation is a consequence of the relative positioning of axes 42, 72a, 80a, 82a.

This slight amount of relative angular movement which occurs between the bottom end of the air bag and frame 20 with rocking of the rock structure tends to minimize stresses and wear at the opposite ends of the inflatable portion in the bag. Very importantly, the lower end of the bag is not subjected to the considerably larger amount of relative angular movement that occurs in the rock structure. Further, because the bottom end of the bag is permitted to change its angular position slightly, this minimizes the undesirable wearing effects of the slight amount of relative lateral displacement (i.e., side-to-side from left to right in FIG. 4) which occurs between the opposite ends of the bag as the rock structure rocks.

The same kind of operation obviously takes place in the other suspension means in the trailer.

As was mentioned briefly earlier, one advantage in an air bag type suspension is that the air bags can be selectively inflated and deflated to change the elevation of their associated vehicle frame. Trailer 14 is intended to be used in this manner in conjunction with the picking up and depositing of loads, such as load 18, which are quite difficult otherwise to maneuver onto and off of the trailer. For example, and assuming that a load such as load 18 is ready to be picked up and is supported at a suitable elevation above the ground on some arrangement of posts or other supporting structure, through deflating the air bags in the trailer, frame 20 may be lowered to a position such as that shown in dashed outline at 20A in FIG. 2, and backed up beneath the load. The air bags may then be inflated to pick the load up, whereby it (the load) becomes fully supported on the trailer frame. The load may then be carried away on the frame. By reversing this process at the point of destination, the load can easily be deposited and separated from the frame.

In the particular embodiment illustrated herein, the air bags are afforded a relatively long stroke to accommodate a relatively wide range of frame elevations. This stroke is illustrated generally in FIG. 4 where the extreme positions C, D are shown for the lower end of a bag. Such a wide operating range for the air bags is, of course, promoted by the fact that their lower ends, as contemplated herein, are permitted but a slight amount of angular movement relative to the trailer frame. Thus, stress in the bags is minimized.

In a situation where it is desired to lower one side of the trailer frame relative to the other side, as for example when hauling the trailer along sideways-sloped ground, the air bags on one side of the frame may be suitably inflated and those on the other side suitably deflated to adjust the attitude of the frame.

While a preferred embodiment of the invention has been described herein it is appreciated that variations and modifications may be made without departing from the spirit of the invention.

It is claimed and desired to secure by Letters Patent:

1. Means for suspending an axle on the frame of a vehicle comprising
    an elongated rock structure having one end adapted to be pivoted on said frame for rocking about a generally horizontal rock axis that extends transversely of the longitudinal axis of said frame, and another end adapted to mount an axle with the axis thereof substantially parallel to said rock axis,
    an elongated extensible-contractible air bag,
    first mounting means adapted to mount one end of said bag rigidly on said frame,
    second mounting means adapted to mount the other end of said bag on said rock structure adjacent the latter's said other end, whereby extension and contraction of the bag are accompanied by rocking of the rock structure, said second mounting means being pivoted to said rock structure, and when so mounting the bag's said other end accommodating relative angular movement between said other end of said bag and said rock structure, and
    an elongated link for operatively interconnecting said frame and said second mounting means including one end adapted to be pivoted on said frame at a point adjacent but displaced from said rock axis, and another end pivoted to said second mounting means adjacent but displaced from the pivot connection between the second mounting means and the rock structure, said link being adapted, when so connected, and with rocking of said rock structure through a given angle, to produce relative angular movement between said second mounting means and said frame which is less in magnitude than that between said rock structure and said frame.

2. Means in a vehicle suspending an axle therein on the vehicle's frame comprising
    an elongated rock structure having one end pivoted on said frame for rocking about a generally horizontal rock axis that extends transversely of the longitudinal axis of said frame, and another end mounting said axle with the axis thereof substantially parallel to said rock axis,
    an elongated extensible-contractible air bag,
    first mounting means mounting one end of said bag rigidly on said frame,
    second mounting means mounting the other end of said bag on said rock structure adjacent the latter's said other end, whereby extension and contraction of the bag are accompanied by rocking of the rock structure, said second mounting means being pivoted to said rock structure, and accommodating relative angular movement between said other end of said bag and said rock structure, and
    an elongated link operatively interconnecting said frame and said second mounting means including one end pivoted on said frame at a point adjacent but displaced from said rock axis, and another end pivoted to said second mounting means adjacent but displaced from the pivot connection between the second mounting means and the rock structure, said link being adapted with rocking of said rock structure through a given angle to produce relative angular movement between said second mounting means and said frame which is less in magnitude than that between said rock structure and said frame.

3. Means in a vehicle suspending an axle therein on the vehicle's frame comprising
    an elongated generally horizontally extending rock structure,
    first pivot means pivoting one end of said rock structure on said frame for rocking about a generally horizontal rock axis which extends transversely of the longitudinal axis of said frame,
    axle support means supporting said axle on said rock structure adjacent the latter's other end with the axis of the axle substantially paralleling said rock axis,
    an elongated generally vertically disposed extensible-contractible air bag having its upper end anchored to said frame,
    a bracket secured to the lower end of said bag,
    second pivot means interconnecting said bracket and said rock structure adjacent the latter's said other end providing a pivot axis substantially paralleling said rock axis,
    an elongated generally horizontally disposed rigid link,
    third pivot means pivoting one end of said link to said frame below said first pivot means, said third pivot means providing a pivot axis which substantially parallels said rock axis, and
    fourth pivot means pivoting the other end of said link to said bracket below said second pivot means, said fourth pivot means also providing a pivot axis substantially paralleling said rock axis.

4. The suspension means of claim 3, wherein the spacing between the axes of said second and fourth pivot means is greater than that between the axes of said first and third pivot means.

5. The suspension means of claim 4, wherein the spacing between the axes of said third and fourth pivot means is greater than that between the axes of said first and second pivot means.

* * * * *